(12) United States Patent
Miyaji et al.

(10) Patent No.: US 7,114,746 B2
(45) Date of Patent: Oct. 3, 2006

(54) AIR BAG-USE GAS GENERATOR AND AIR BAG DEVICE

(75) Inventors: Katsuhito Miyaji, Hyogo (JP); Yasunori Iwai, Osaka (JP)

(73) Assignee: Daicel Chemical Industries, Ltd., Osaka (JP)

( * ) Notice: Subject to any disclaimer, the term of this patent is extended or adjusted under 35 U.S.C. 154(b) by 103 days.

(21) Appl. No.: 10/415,643

(22) PCT Filed: Dec. 27, 2001

(86) PCT No.: PCT/JP01/11575

§ 371 (c)(1),
(2), (4) Date: May 1, 2003

(87) PCT Pub. No.: WO02/051675

PCT Pub. Date: Jul. 4, 2002

(65) Prior Publication Data

US 2004/0051289 A1    Mar. 18, 2004

(30) Foreign Application Priority Data

Dec. 27, 2000 (JP) .............................. 2000-396969
Dec. 27, 2000 (JP) .............................. 2000-396970

(51) Int. Cl.
*B60R 21/26* (2006.01)
(52) U.S. Cl. .................................................... 280/741
(58) Field of Classification Search ................ 280/741, 280/740, 742, 736
See application file for complete search history.

(56) References Cited

U.S. PATENT DOCUMENTS 4,950,458 A    8/1990  Cunningham
4,998,751 A    3/1991  Paxton et al.
5,005,486 A    4/1991  Lenzen
5,713,597 A    2/1998  Bailey (Continued)

FOREIGN PATENT DOCUMENTS

DE    90 13 131.2    1/1991

(Continued)

*Primary Examiner*—Faye M. Fleming
(74) *Attorney, Agent, or Firm*—Birch, Stewart, Kolasch & Birch, LLP

(57) ABSTRACT

A gas generator for an air bag having a simple structure, which is activated to apply as small an impact as possible to a vehicle occupant at the initial stage of activation and, thereafter, can reliably protect the vehicle occupant by rapidly increasing gas pressure, is provided. It is a gas generator for an air bag in which an inner cylindrical member is disposed in the housing to define an ignition means accommodating chamber and a combustion chamber, plural flame-transferring holes for communicating the both chambers with each other are formed on the circumferential surface of the inner cylindrical member, and the plural flame-transferring holes are formed at a distance of less than 30% of the axial length of the inner cylindrical member, from an end of the inner cylindrical member. A gas generator, which can use even a gas generating agent with less ignitability, and further can exhibit enough operation performance at the initial stage of activation even when using such a gas generating agent, is provided. It is a gas generator for an air bag in which an inner cylindrical member is disposed in the housing to define an ignition means accommodating chamber and a combustion chamber, and the central angle formed by the adjacent communicating portions which are formed on the circumferential surface of the inner cylindrical member is adjusted to be not more than 60 degrees.

25 Claims, 4 Drawing Sheets

U.S. PATENT DOCUMENTS

| | | | |
|---|---|---|---|
| 6,364,354 B1 * | 4/2002 | Nakashima et al. | ........ 280/736 |
| 6,412,815 B1 * | 7/2002 | Nakashima et al. | ........ 280/736 |
| 6,540,256 B1 | 4/2003 | Iwai et al. | |

FOREIGN PATENT DOCUMENTS

| | | |
|---|---|---|
| DE | 42 08 843 A1 | 9/1993 |
| EP | 0 665 138 A2 | 8/1995 |
| EP | 0 798 174 A1 | 10/1997 |
| EP | 0867347 A1 | 9/1998 |
| EP | 0 926 015 A2 | 6/1999 |
| EP | 0 934 854 A1 | 8/1999 |
| EP | 1 110 826 A1 | 6/2001 |
| JP | 8-207696 A | 8/1996 |
| JP | 11-59318 A | 3/1999 |
| JP | 11-189124 A | 7/1999 |
| JP | 11-189126 A | 7/1999 |
| JP | 11-217055 A | 8/1999 |
| JP | 11-334517 A | 12/1999 |
| JP | 11-348711 A | 12/1999 |
| JP | 2000-198409 A | 7/2000 |
| WO | WO 96/10495 A1 | 4/1996 |

* cited by examiner

AIR BAG-USE GAS GENERATOR AND AIR BAG DEVICE

This application is the national phase under 35 U.S.C. §371 of PCT International Application No. PCT/JP01/11575 which has an International filing date of Dec. 27, 2001, which designated the United States of America.

TECHNICAL FIELD TO WHICH THE INVENTION BELONGS

The present invention relates to a gas generator for an air bag for protecting a vehicle occupant from the impact, particularly, to a gas generator for an air bag characterized in its operation performance, and an air bag apparatus.

RELATED ART

In a vehicle such as an automobile, in order to prevent the passenger from crashing into a hard portion inside the vehicle such as a steering wheel and a windshield due to an inertia and being injured or dying when the vehicle collides at a high speed, an air bag system, which inflates an air bag rapidly with a gas to protect the passenger from colliding with such a dangerous portion, is provided.

It is desirable that such an air bag system can safely restrain the vehicle occupant even when the frame of the vehicle occupant (for example, whether a sitting height is high or low, whether an adult or a child, and the like), a sitting attitude (for example, an attitude of holding on the steering wheel) and the like are different. Then, there has been conventionally suggested an air bag system which is activated, applying the impact to the passenger as small as possible at the initial stage of the activation.

JP-A 8-207696 suggests using two kinds of gas generating agent capsules for generating a gas at two stages comprising a first stage in which an air bag is inflated relatively slowly and a second stage in which a gas is generated rapidly. However, in this art, there is a defect that the interior structure of the gas generator is complicated and the size of the container is made large, which results in factors of increasing a cost.

Also in U.S. Pat. No. 4,998,751 and U.S. Pat. No. 4,950,458, in order to restrict the operation performance of the gas generator, it is proposed to provide two combustion chambers and burn the gas generating agent at two stages. However, the structure is complicated and it is not satisfactory yet.

In addition, relating to the activation of the gas generator, it needs to be rapidly activated just after the collision of the vehicle and produce a cushion between the vehicle occupant and the vehicle before the vehicle occupant collides with structures in the vehicle.

For that reason, a gas generator, which is quickly activated by an activation signal received from a sensor having detected the impact, and that rapidly generates an enough amount of gas for inflating an air bag, is demanded.

Such a problem has already been solved by many gas generators provided so far, too.

However, the gas generators provided so far could not give enough operation performance when the characteristics of a gas generating agent used (for example, combustion performance) are changed, since they are designed with respect to each gas generating agent used in them, that is, they are designed for the composition producing an operation gas for actually inflating an air bag.

DISCLOSURE OF THE INVENTION

The present invention provides a gas generator for an air bag which is simple in construction, is activated to apply as small an impact as possible to a vehicle occupant at the initial stage of activation and, at a subsequent activation stage, can reliably protect the vehicle occupant. For a gas generator for the driver side, for example, this invention provides a gas generator for an air bag exhibiting an operation performance such that the inflation speed of the air bag during a period of 10 milliseconds from the start of activation of the gas generator is moderated, compared with the conventional inflator, and at 30 to 50 milliseconds after the activation, the vehicle occupant is restrained well. Also, this invention provides an air bag apparatus using this gas generator.

The above objective of this invention is achieved by a gas generator for an air bag comprising, in a housing having a gas discharging port, a substantially cylindrical inner cylindrical member disposed in the housing, an ignition means accommodating chamber formed inside the inner cylindrical member, a combustion chamber formed outside the inner cylindrical member, and plural flame-transferring holes formed on the circumferential surface of the inner cylindrical member to communicate the ignition means accommodating chamber with the combustion chamber, wherein the plural flame-transferring holes are formed at a distance of less than 30% of the axial length of the inner cylindrical member, from an end of the inner cylindrical member. The plural flame-transferring holes are preferably formed at a distance of within 25% of the axial length of the inner cylindrical member, from an end of the inner cylindrical member.

The inner cylindrical member is disposed inside the housing and defines the ignition means accommodating chamber in the inside and the combustion chamber in the outside. At least, an ignition means accommodating chamber needs to be defined inside the inner cylindrical member, however, it is possible to provide another chamber, for example a combustion chamber (that is, a second combustion chamber) existing separately from the combustion chamber existing outside the inner cylindrical member. The ignition means accommodating chamber is a chamber for accommodating an ignition means for activating the gas generator, and the combustion chamber is a chamber for accommodating a gas generating means ignited and burnt by the activated ignition means. And, the flame-transferring hole is a penetrating hole to discharge a flame of the ignition means for igniting the gas generating means into a combustion chamber. Also, this inner cylindrical member includes a member having a flange at the end opening, as long as it has a cylindrical circumferential wall surface.

In the present invention above, an igniter, which is activated when an ignition electric current for activation is applied, is accommodated in the one end side of the inner cylindrical member disposed in the housing, and plural flame-transferring holes can be formed in the end being opposite to the igniter, divided with respect to the axial center of the inner cylindrical member.

In addition, the gas generator of this invention can comprise, in a housing having a gas discharging port, a substantially cylindrical inner cylindrical member disposed in the housing, an ignition means accommodating chamber for accommodating an ignition means defined inside the inner cylindrical member, a combustion chamber for accommodating a gas generating agent defined outside the inner cylindrical member, and plural communicating portions formed circumferentially on the circumferential surface of the inner cylindrical member to communicate the ignition means accommodating chamber with the combustion chamber, wherein the central angle formed by the adjacent communicating portions can be more than 60 degrees.

The above gas generator is usually formed such that, when the ignition means disposed in the ignition means accommodating chamber is activated, it generates a flame and the flame is ejected into the combustion chamber through the plural flame-transferring holes formed on the circumferential surface of the inner cylindrical member.

Then, in order to solve the above problem, the present invention provides a gas generator for an air bag in which ejecting angle of a flame ejecting through the flame-transferring holes is adjusted.

In other words, there is provided a gas generator for an air bag comprising, in a housing having a gas discharging port, a substantially cylindrical inner cylindrical member disposed in the housing, an ignition means accommodating chamber for accommodating an ignition means defined inside the inner cylindrical member, a combustion chamber for accommodating a gas generating agent defined outside the inner cylindrical member, and plural flame-transferring holes formed circumferentially in the circumferential surface of the inner cylindrical member to eject a flame generated by activation of the ignition means into the combustion chamber, wherein the flame-transferring holes eject the flame into the combustion chamber at an elevation angle and a depression angle of 45 degrees.

According to the present invention described above, there can be provided a gas generator which is activated to apply as small an impact as possible to a vehicle occupant at the initial stage of activation and can reliably protect the occupant at a subsequent activation stage.

Concretely, the operation performance of the gas generator can be adjusted such that the tank pressure measured at $0.25 \times T$ milliseconds is not more than $0.25 \times P(kPa)$ when a predetermined maximum tank pressure is $P(kPa)$ and a period of time from the start of rising of the tank pressure to the time when the maximum tank pressure $P(kPa)$ has been reached is T milliseconds in tank combustion test. This operation performance is preferably adjusted further such that the tank pressure measured at $0.80 \times T$ milliseconds is not less than $0.70 \times P(kPa)$.

Also, in the gas generator of the present invention, it is preferable that the peak of a pressure inside the housing during the activation of the gas generator is obtained at 10 to 20 milliseconds after the ignition electric current is applied. That is, the pressure inside the housing preferably reaches its maximum at 10 to 20 milliseconds after the ignition electric current is applied.

In the gas generator of the present invention, the combustion gas of the gas generating agent is discharged gradually from the gas discharging port to increase the pressure of the gas generator and to slowly increase the pressure in the tank, before the peak of the maximum combustion pressure inside the housing, which is before 10 to 20 milliseconds after the ignition electric current is applied. After the pressure inside the housing of the gas generator reaches its peak, a sufficient amount of a gas to restrain the vehicle occupant is rapidly discharged from the gas discharging port to lower the pressure in the gas generator and at the same time, to sharply increase the pressure in the tank. Such a gas generator is realized by a gas generator having the operation performance adjusted such that the tank pressure measured at $0.25 \times T$ milliseconds is not more than $0.25 \times P(kPa)$ when a predetermined maximum tank pressure is $P(kPa)$ and a period of time from the start of rising of the tank pressure to the time when the maximum tank pressure $P(kPa)$ has been reached is T milliseconds in tank combustion test. In the gas generator of this invention having such an operation performance, the output at the initial stage of activation is suppressed, so that the airbag (bag body) accommodated in the module can be prevented from rapidly inflating at the initial stage of activation and from applying excess impacts to the vehicle occupant. To the contrary to this, when the tank pressure measured at $0.25 \times T$ milliseconds is not less than $0.25 \times P$ (kPa), the inflation force of the air bag at the time of breaking the module may be too strong depending on the operation circumstance (for example, outside air temperature), whereby making it difficult to obtain the aimed effect of the invention., In the gas generator for an air bag of the present invention, at least the flame-transferring hole, which is formed in the inner cylindrical member defining the combustion chamber and the ignition means accommodating chamber in the housing, needs to be formed not in the center but on either end side of the inner cylindrical member, however, other configuration than this, for example, a composition and shape of a gas generating means, the existence of a coolant or a filter for cooling and/or purifying an operation gas generated by the combustion of gas generating means, the whole shape of the housing, and so on can be adjusted appropriately according to the operation performance. For example, as to the gas generating means to be burnt and generate an operation gas, besides azide type gas generating agent based on inorganic azides which have conventionally been used widely, for example, sodium azide, it is possible to use non-azide type gas generating agent not based on inorganic azide etc. Also, size and number of gas discharging ports formed in the housing, the size and whole shape of housing, and so on can be adjusted appropriately according to operation performance and accommodating space.

The above gas generator for an air bag is accommodated in the module case together with an air bag (bag body) to introduce a gas generated in the gas generator to inflate, thereby being an air bag apparatus. In this air bag apparatus, the gas generator is activated upon the impact sensor detecting the impact to discharge an operation gas from the gas discharging port of the housing. The operation gas flows into the air bag, and thereby the air bag inflates to break a module cover and forms a cushion absorbing the impact between a hard structure in the vehicle and an occupant.

The gas generator of the present invention provides a gas generator for an air bag which is simple in structure and that is activated to apply as small an impact as possible to a vehicle occupant at the initial stage of activation and can reliably protect the vehicle occupant by inflating the air bag rapidly at a subsequent activation stage.

Next, the present invention provides a gas generator for an air bag having a structure capable of using even a gas generating agent whose ignitability is less than a gas generating agent conventionally used in gas generators. That is, it provides a gas generator which can exhibit satisfactory operation performance at the initial stage of operation even when it uses such a gas generating agent. Also, an air bag apparatus using this gas generator is provided.

The above objective of this invention is achieved by an gas generator for an air bag comprising, in a housing having a gas discharging port, a substantially cylindrical inner cylindrical member disposed in the housing, an ignition means accommodating chamber for accommodating an ignition means defined inside the inner cylindrical member, a combustion chamber for accommodating a gas generating agent defined outside the inner cylindrical member, and plural flame-transferring holes formed on the circumferential surface of the inner cylindrical member to eject a flame generated by the activation of the ignition means into a first combustion chamber, wherein the flame-transferring holes are formed at a distance of 30% to 70% of the axial length of the inner cylindrical member, from an end of the inner cylindrical member.

The objective of the present invention is achieved also by a gas generator comprising plural communicating portions formed circumferentially on the circumferential surface of the inner cylindrical member to communicate the ignition means accommodating chamber with the combustion chamber, wherein the central angle formed by the adjacent communicating portions is adjusted to be not more than 60 degrees, preferably not more than 45 degrees.

The inner cylindrical member above is disposed inside the housing to define the ignition means accommodating chamber in the inside and the combustion chamber in the outside. Therefore, at least an ignition means accommodating chamber needs to be arranged inside the inner cylindrical member, but further another chamber such as a combustion chamber (that is, a second combustion chamber) existing separately from the combustion chamber existing outside the inner cylindrical member can be provided. The ignition means accommodating chamber is a chamber for accommodating an ignition means to activate the gas generator, and the combustion chamber is a chamber for accommodating a gas generating means ignited and burnt by the activated ignition means. And the flame-transferring holes are penetrating holes to eject a flame of the ignition means for igniting the gas generating means into a combustion chamber. Also, the inner cylindrical member contains one having a flange at the end opening, as long as it has a cylindrical circumferential wall surface.

These communicating portions can comprise one or at least two flame-transferring holes radially penetrating in the inner cylindrical member. That is, for example, when a single flame-transferring hole becomes a communicating portion, the communicating portion become the flame-transferring hole substantially. However, when each penetrating portion comprises the plural flame-transferring holes, so-called groups of the flame-transferring holes comprising the plural flame-transferring holes are formed circumferentially in the inner cylindrical member with the above predetermined intervals.

Especially, when the communicating portion comprises a single flame-transferring hole, this flame-transferring hole is desirably formed to have the inner diameter of 1 to 4 mm, preferably 1.8 to 3.2 mm.

Further, in the above gas generator, an ejecting angle of a flame or heat mist of the ignition means ejected from the plural communicating portions is preferably adjusted to be in the range of horizontal angle which is not less than 60 degrees, and preferably not less than 90 degrees, having the center as the axis perpendicular to the center of the communication portion.

The above problem can be also solved by a gas generator in which the internal pressure of the housing reaches its maximum at 5 to 20 milliseconds after the ignition electric current is applied at the time of the activation. In this case, the surface area of gas generating agent, which is ignited at 2 milliseconds after the ignition electric current is applied to the igniter, is preferably 30 to 90% and more, and more preferably 40 to 60% and more of the total surface area of the gas generating agent accommodated originally in the combustion chamber.

According to the above gas generator of the present invention, by a flame of ignition means ejected from the communication portion, the gas generating agent accommodated in the combustion chamber can be ignited at once to start combustion. That is, the ignitability of gas generating agent can be improved at the initial stage of the activation of the gas generator can be improved.

In the gas generator for an air bag of the present invention, at least the inner cylindrical member for defining the combustion chamber and the ignition means accommodating chamber in the housing needs to be disposed, and as to communication portions formed circumferentially on the circumferential surface of the inner cylindrical member and capable of communicating both chambers with each other, the central angle formed by the adjacent communicating portions needs to be adjusted to be not more than 60 degrees, however, other configuration than this, for example, a composition and shape of a gas generating means, the existence of a coolant or a filter for cooling and/or purifying an operation gas generated by the combustion of gas generating means, the whole shape of the housing, and so on can be adjusted appropriately according to the operation performance. For example, as to the gas generating means to be burnt and generate an operation gas, besides azide type gas generating agent based on inorganic azides which have conventionally been used widely, for example sodium azide, it is possible to use non-azide type gas generating agent not based on inorganic azide etc. Also, a size and number of gas discharging ports formed in the housing, a size and whole shape of housing, and so on can be adjusted appropriately according to operation performance and an accommodating space.

The above gas generator for an air bag is accommodated in the module case together with an air bag (bag body) to introduce a gas generated in the gas generator to inflate, thereby being an air bag apparatus. In this air bag apparatus, the gas generator is activated upon the impact sensor detecting the impact to discharge an operation gas from the gas discharging port of the housing. The operation gas flows into the air bag, and thereby the air bag inflates to break a module cover and forms a cushion absorbing the impact between a hard structure in the vehicle and an occupant.

The present invention is a gas generator for an air bag having a structure capable of using even a gas generating agent with low ignitability, and further, it can be a gas generator which can exhibit satisfactory operation performance at the initial stage of activation even when it uses such a gas generating agent. That is, even when the characteristics of gas generating agent used (such as combustion performance) is changed, a gas generator which exhibits initial operation performance or similar thereto is realized.

Further, a gas generator having such an effect is realized through a simple structure.

The operation performance of the above gas generator can be confirmed by means of tank combustion test described below.

Tank Combustion Test

A gas generator for an air bag is fixed in a SUS (stainless steel) tank having the internal volume of 60 liters. After the tank is hermetically closed at a room temperature, the gas generator is connected to an external ignition electric circuit. A pressure transducer installed in the tank separately is used to measure a change in the increasing pressure in the tank for the duration from 0 to 200 milliseconds, with the moment at which the ignition electric circuit switch is turned on (the ignition current is applied) taken as time 0(zero). The measured data are then processed by a computer to generate a tank pressure/time curve (hereinafter referred to as a "tank curve") which is used to evaluate the performance of the gas generator. After the combustion is over, part of the gas in the tank may be sampled for submitting to analysis of CO, NOx and so on.

Similarly, a change in the increasing pressure inside the housing is measured for the duration from 0 to 200 milliseconds, with the moment at which the ignition electric current is applied taken as time 0 (zero), to obtain the change with time of the pressure inside the housing. Using this, the time until the pressure inside the housing becomes its maximum, that is, the time to the maximum internal pressure can be specified.

The tank maximum pressure in this invention means the maximum pressure in the SUS tank during the tank combustion test, and the maximum internal pressure is the maximum pressure in the housing when the gas generator is activated (that is, maximum internal pressure in the housing).

Explanation of Reference Numerals

Figure 1:
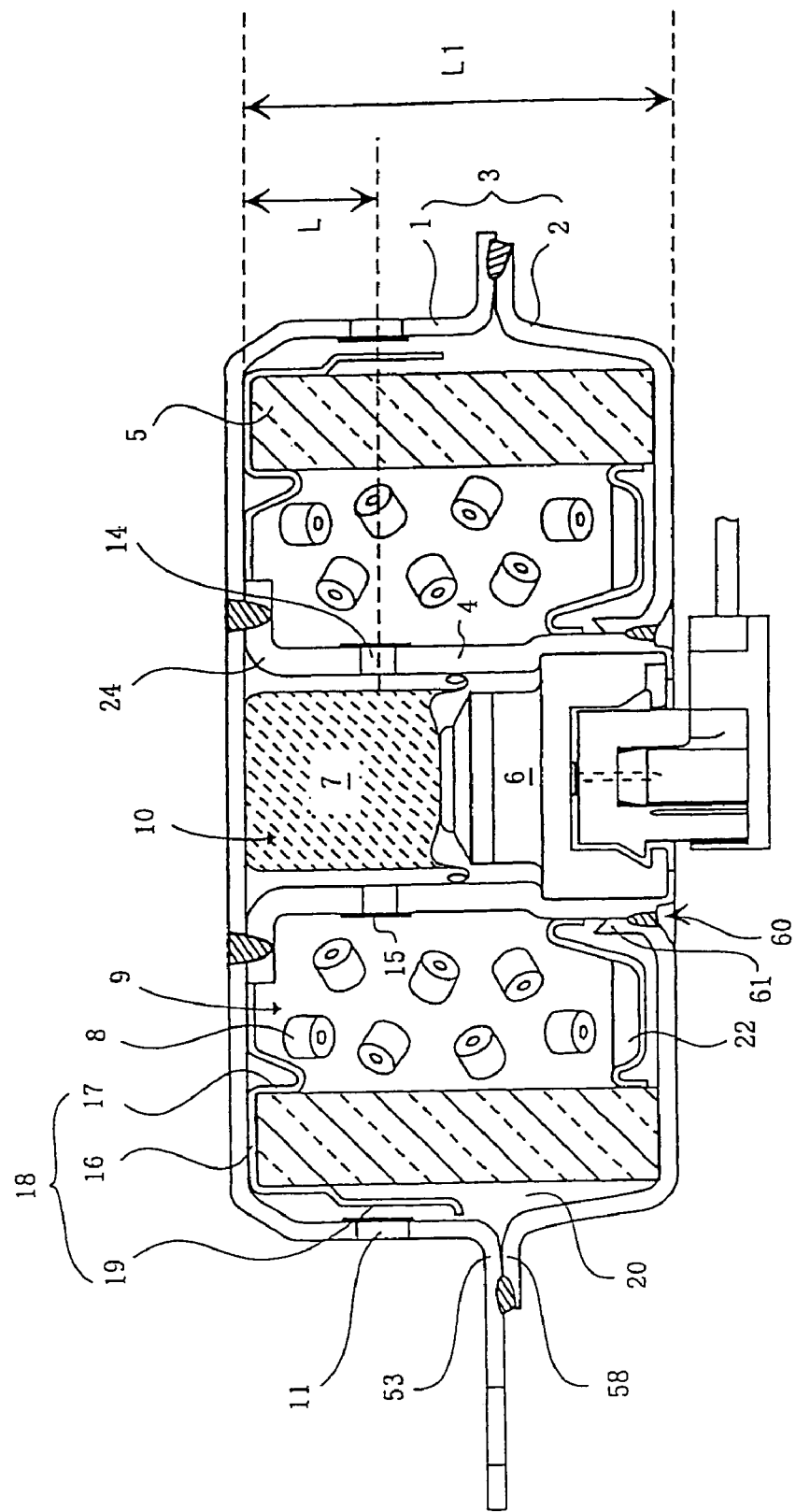
FIG. 1 is a schematic vertical cross sectional view showing one embodiment of the gas generator for an air bag of the present invention.

1 Diffuser Shell
2 closure shell
3 housing
4 igniter
5 transfer charge
6 gas generating agent
7 coolant/filter Embodiment 1 of the Invention The housing of the gas generator for an air bag of the present invention and the gas generator for an air bag using the same will be explained as follows according to the embodiments shown in the figures.

FIG. 1 is a schematic vertical cross section showing one embodiment of the gas generator for an air bag of the present invention.

The gas generator shown in this figure contains, in the housing 3 having a gas discharging port 11, an ignition means comprising an electric type igniter 6 and a transfer charge 7, and a gas generating means which generates an operation gas to inflate an air bag by activation of the ignition means (that is, a gas generating agent 8), and further a coolant/filter means (that is, a coolant 5) to cool an operation gas generated by combustion of the gas generating agent 8 is disposed between the combustion chamber 9 in which the gas generating agent 8 is accommodated and a circumferential wall portion of the housing 3. And, a deflecting member 18 having a cylindrical portion 19 is disposed at the end portion in the diffuser shell 1 side of coolant 5.

The housing 3 is formed from a diffuser shell 1 having a cylindrical shape with a top and a closure shell 2 having a cylindrical shape with a bottom, and both shells are integrated by welding at outward flange portions 53 and 58 formed at each opening. Between these, a circumferential wall of the closure shell is formed to expand outwardly in the radial direction at the flange portion 58 side.

In the housing, a inner cylindrical member 4 having a flange portion 24 jointed to the interior surface of the housing ceiling portion is disposed, and the inside of the inner cylindrical member 4 becomes an ignition means accommodating chamber 10 and the outside thereof becomes a combustion chamber 9. Both chambers are formed to communicate with each other through aflame-transferring hole 14 provided on a circumferential surface of the inner cylindrical member 4. The ignition means accommodating chamber 10 accommodates an ignition means comprising an igniter 6 which receives an activation signal (that is, an ignition electric current for activation) to activate, and a transfer charge 7 ignited and burnt by the activation of the igniter. Also, the combustion chamber 9 accommodates a gas generating agent 8 which is ignited and burnt by a flame of the ignition means (a flame of the transfer charge 7 in this embodiment) to generate an operation gas for inflating an air bag.

The igniter 6 constituting the ignition means is fixed at the bottom end by crimping a bottom end opening of inner cylindrical member 4, and the transfer charge 7 is disposed directly over the igniter 6. And, a flame-transferring hole 14 formed on a circumferential surface of the inner cylindrical member 4 is provided in the opposite side of the igniter side in the inner cylindrical member (that is, in the transfer charge 7 side in the figure). In this embodiment, the flame-transferring hole 14 is formed at a distance of less than 30% of the axial length of the inner cylindrical member 4, from the end in the side where the flange is formed.

A gas generating agent is ignited by a flame or heat mist of transfer charge ejected from the flame-transferring hole 14. And, as described above, by adjusting the position (height) at which flame-transferring holes are formed, the ignited area of a gas generating agent at 2 milliseconds after the ignition electric current is applied can be adjusted. For example, when the axial length of the inner cylindrical member is about 29 mm and the flame-transferring holes are formed at a distance of 7 mm from the end surface of the flange portion, it is estimated that 50% of the total surface area of the originally loaded gas generating agent is ignited at 2 milliseconds after the ignition electric current is applied.

The inner cylindrical member 4 whose end portion is crimped to fix the igniter 6 is received by an opening portion 60 of the closure shell 2 described below, and is integrated with closure shell 2 by welding in a state of fixing the igniter 6. Concretely, a round portion 61 bending inwardly into the housing 3 is formed integrally with the opening portion 60, and this round portion 61 and the inner cylindrical member 4 are welded. Because of the round portion 61 bent inwardly into the housing 3, it is avoided that only the round portion 61 protrudes axially out of the housing 3, and, to that extent, the total height of the housing 3 itself can be suppressed, and furthermore, the total height of the gas generator can be suppressed. Alternatively, when a gas generator formed in this manner has the same height as the height of a gas generator in which a round portion 61 is bent towards the outside of the housing 3, a larger inner volume of the housing can be obtained with the same height and the outer diameter. Further, the round portion 61 can support a substantially circular underplate 22 supporting a gas generating means.

The cylindrical coolant 5 made of a laminated wire mesh and the like is supported by bent portions formed at end portions of the respective shells 1 and 2, and disposed to face practically the inner circumferential surface of the housing.

And, between the outer circumferential surface of this coolant 5 and the inner circumferential surface of the housing 3, a space 20 which serves as a flow path of an operation gas is obtained. By this space 20, the whole coolant 5 can work effectively.

As the coolant 5, it is preferable not to swell radially and outwardly due to the pressure of passing an operation gas. The reason is that, if the coolant 5 swells due to passing of the gas generating means, the space 20 secured between the coolant 5 and the inner circumferential surface of the housing is blocked, and can not effectively function as a gas flow-path. Hence, the coolant 5 shown in this embodiment is formed to have a tensile strength in the radial direction of 12,054N (1,230 kgf).

A deflecting member 18 is disposed between the end surface of this coolant 5 and the inner surface of the diffuser shell 1. This deflecting member 18 is effective in case of using the gas generating agent 8 that produces fluid or semifluid combustion products after combustion.

The reason is that, combustion products generated by combustion of the gas generating agent can be removed by the cylindrical portion 19 of the deflecting member 18 which makes the combustion products adhere thereto or crash thereinto to drop them. Also, in the deflecting member 18, a circular portion 16 which abuts against the end surface of coolant 5 is formed to have an appropriate elasticity, so that the coolant 5 which is formed from wire mesh and has little elasticity in the axial direction can be used as the coolant 5 disposed radially outside the combustion chamber 9. Further, in deflecting member 18, a wall portion 17 abutting against an inner circumferential surface of the coolant 5 is formed integrally with the circular portion 16. With this, the coolant 5 can be located and fixed, and additionally, so-called short-pass in which an operation gas is discharged without passing through the coolant can be prevented.

In the gas generator formed as described above, the transfer charge 7 is ignited and burnt by the igniter 6 activated by the application of the ignition electric current for activation, and the flame thereof is released, through the flame-transferring hole 14 in inner cylindrical member 4, into the accommodating space for gas generating agent 8. The flame of the transfer charge 7 is to ignite and burn the gas generating agent 8. And even when part of the flame passes directly through the coolant 5, it crashes into the cylindrical portion 19 of the deflecting member 18, and thereby, the flame can never be ejected directly through the gas discharging port 11. The operation gas generated by the gas generating agent 8 which is ignited by the flame of the transfer charge 7 passes through the coolant 5 and reaches the space 20 secured between the outer circumferential surface of the coolant 5 and the inner circumferential surface of the housing 3. If fluid or semifluid combustion products are included in the operation gas having passed coolant 5, those products crash and adhere to the cylindrical portion 19 of the deflecting member 18 arranged in the space 20, and they are removed from the operation gas.

Embodiment 2 of the Invention

The housing of the gas generator for an air bag of the present invention and the gas generator for an air bag using the same will be explained as follows according to the embodiments shown in the figures.

FIG. 1 is a schematic vertical cross section showing one embodiment of the gas generator for an air bag of the present invention.

The gas generator shown in this figure contains, in the housing 3 having a gas discharging port 11, an ignition means comprising an electric type igniter 6 and a transfer charge 7, and a gas generating means which generates an operation gas to inflate an air bag by activation of the ignition means (that is, a gas generating agent 8), and further a coolant/filter means (that is, a coolant 5) to cool an operation gas generated by combustion of the gas generating agent 8 is disposed between the combustion chamber 9 in which the gas generating agent 8 is accommodated and a circumferential wall portion of the housing 3. And, a deflecting member 18 having a cylindrical portion 19 is disposed at the end portion in the diffuser shell 1 side of coolant 5.

The housing 3 is formed from a diffuser shell 1 having a cylindrical shape with a top and a closure shell 2 having a cylindrical shape with a bottom, and both shells are integrated by welding at outward flange portions 53 and 58 formed at each opening. Between these, a circumferential wall of the closure shell is formed to expand outwardly in the radial direction at the flange portion 58 side.

In the housing, a inner cylindrical member 4 having a flange portion 24 jointed to the interior surface of the housing ceiling portion is disposed, and the inside of the inner cylindrical member 4 becomes an ignition means accommodating chamber 10 and the outside thereof becomes a combustion chamber 9. Both chambers are formed to communicate with each other through plural communicating portions provided on a circumferential surface of the inner cylindrical member 4. In this embodiment, the communicating portions are realized by the flame-transferring hole 14, and each communicating portion comprises a single flame-transferring hole 14 formed to have an inner diameter of 1.8 to 3.2 mm. However, the communicating portion can comprise a combination of plural flame-transferring holes having a smaller diameter (as a group of the flame-transferring holes).

When this flame-transferring hole 14 is formed such that the distance (L) from the flame-transferring hole to the end of the inner cylindrical member 4 is 30 to 70% of the axial length of the inner cylindrical member (L1), ignitability of gas generating agent 8 can be improved. For example, as shown in FIG. 1, when an inner cylindrical member having the axial length (L1) of 29 mm is used and a flame-transferring hole 14 is formed to position at 10 mm from the end in the diffuser shell side, an internal pressure reaches the maximum at about 8.2 milliseconds after the ignition electric current is applied. The axial length of the inner cylindrical member 4 is, in principle, based on a state in which it is disposed in a gas generator. However, in most cases, no substantial difference arises even though it is based on a state before being built into a gas generator.

Figure 4:
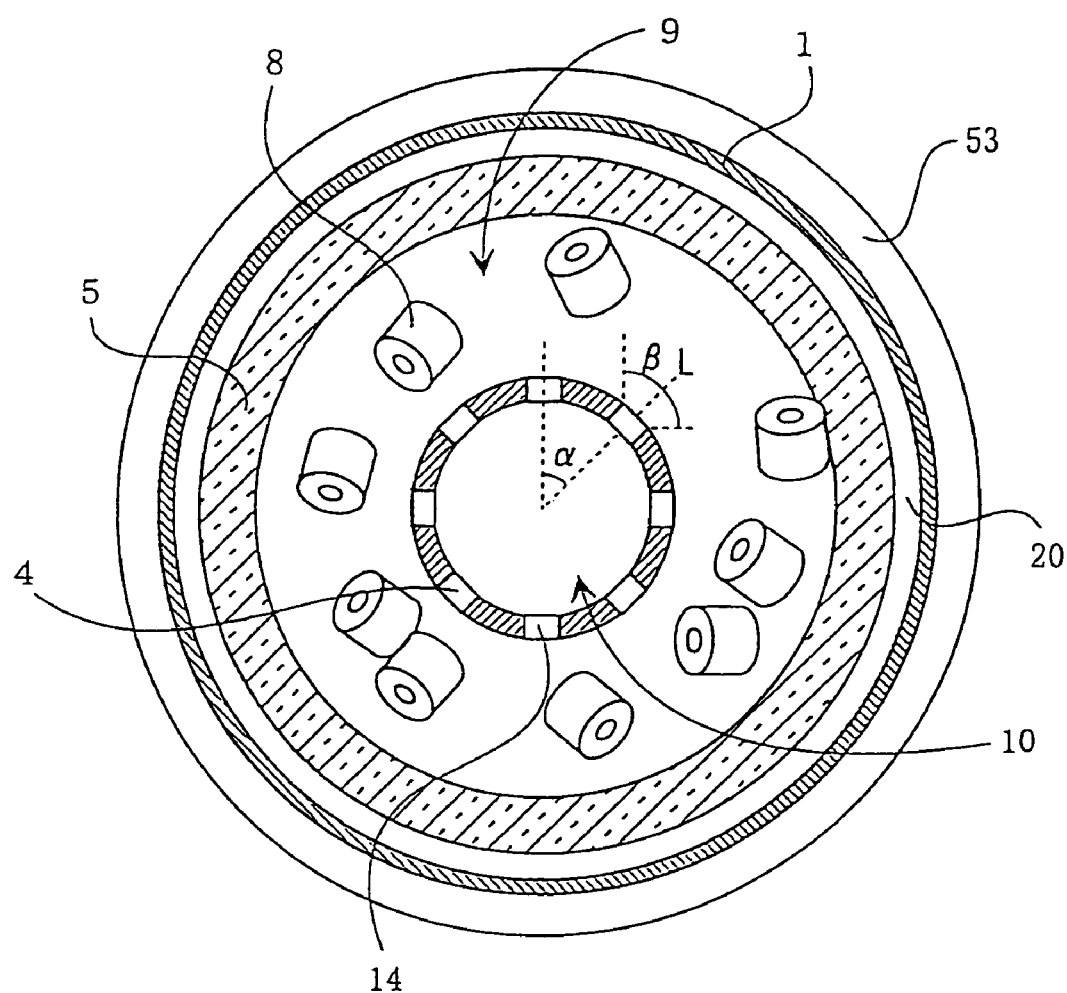
FIG. 4 is principal part of a horizontal cross section of the gas generator shown in the FIG. 1.

And, the ignition means accommodating chamber 10 accommodates the ignition means comprising the igniter 6, which receives an activation signal (that is, an ignition electric current for activation) and activate, and the transfer charge 7 ignited and burnt by activation of the igniter. The igniter 6 constituting the ignition means is fixed at the bottom end by crimping an bottom end opening of inner cylindrical member 4, and the transfer charge 7 is disposed directly over the igniter 6. Also, the combustion chamber 9 accommodates a gas generating agent 8 which is ignited and burnt by a flame of the ignition means (a flame of the transfer charge 7 in this embodiment) to generate an operation gas for inflating an air bag The flame-transferring hole 14 formed on the circumferential surface of the inner cylindrical member 4 is adjusted such that the central angle α (alpha) formed by the adjacent communicating portions is not more than 60 degrees, as shown in the horizontal sectional view of the inner cylindrical member 4 in FIG. 4.

By this, the interval between the adjacent flame-transferring holes 14 can be made small, and a contacting area between a flame of the transfer charge ejected from the flame-transferring hole 14, and the gas generating agent in the combustion chamber can be increased. Thus, an ignited area of the gas generating agent 8 at the initial stage of activation of the gas generator can be larger, and thereby, ignitability of the gas generating agent can be improved. When the communicating portion comprises a single flame-transferring hole 14, for example, in the inner cylindrical member 4, twelve (12) flame-transferring holes 14 having the inner diameter of 1.85 mm can be formed in the circumferential direction (that is, the central angle between the adjacent communicating portions is 30 degrees), eight (8) flame-transferring holes having the inner diameter of 2.2 mm can be formed in the circumferential direction (that is, the central angle between the adjacent communicating portions are 45 degrees), or six (6) flame-transferring holes 14 having the inner diameter of 2.6 mm can be formed in the circumferential direction (that is, the central angle between the adjacent communicating portions is 60 degrees).

In the communicating portions formed in this manner (the flame-transferring holes 14 in this embodiment), when the total area of the communicating holes is almost constant, the smaller the central angle $\alpha$ (alpha) between the adjacent communicating portions becomes, the more improved is the initial ignitability of gas generating agent.

Also, a flame or heat mist of the ignition means (the transfer charge 7 in this embodiment) which is ejected from the plural communicating portions (the flame-transferring holes 14 in this embodiment) are preferably adjusted to be ejected in the range of the horizontal angle $\beta$ (beta) which is not less than 60 degrees having the center as the axis L perpendicular to the center of the flame-transferring holes 14.

The inner cylindrical member 4 whose end portion is crimped to fix the igniter 6 is received by an opening portion 60 of the closure shell 2 described below, and is integrated with closure shell 2 by welding in a state of fixing the igniter 6. Concretely, a round portion 61 bending inwardly into the housing 3 is formed integrally with the opening portion 60, and this round portion 61 and the inner cylindrical member 4 are welded. Because of the round portion 61 bent inwardly into the housing 3, it is avoided that only the round portion 61 protrudes axially out of the housing 3, and, to that extent, the total height of the housing 3 itself can be suppressed, and furthermore, the total height of the gas generator can be suppressed. Alternatively, when a gas generator formed in this manner has the same height as the height of a gas generator in which a round portion 61 is bent towards the outside of the housing 3, a larger inner volume of the housing can be obtained with the same height and the outer diameter. Further, the round portion 61 can support a substantially circular underplate 22 supporting a gas generating means.

The cylindrical coolant 5 made of a laminated wire mesh and the like is supported by bent portions formed at end portions of the respective shells 1 and 2, and disposed to face practically the inner circumferential surface of the housing. And, between the outer circumferential surface of this coolant 5 and the inner circumferential surface of the housing 3, a space 20 which serves as a flow path of an operation gas is obtained. By this space 20, the whole coolant 5 can work effectively.

Preferably, the coolant 5 does not swell radially and outwardly due to the pressure in passing an operation gas there through. The reason is that, if the coolant 5 swells due to passing of the operation gas, the space 20 secured between the coolant 5 and the inner circumferential surface of the housing is blocked, and can not effectively function as a gas flow-path. Hence, the coolant 5 shown in this embodiment is formed to have a tensile strength in the radial direction of 12,054N (1,230kgf).

A deflecting member 18 is disposed between the end surface of this coolant 5 and the inner surface of the diffuser shell 1. This deflecting member 18 is effective in case of using the gas generating agent 8 that produces fluid or semifluid combustion products by combustion.

The reason is that, combustion products generated by combustion of the gas generating agent can be removed by the cylindrical portion 19 of the deflecting member 18 which makes the combustion products adhere thereto or crash thereinto to drop them. Also, in the deflecting member 18, a circular portion 16 which abuts against the end surface of coolant 5 is formed to have an appropriate elasticity, so that the coolant 5 which is formed from wire mesh and has little elasticity in the axial direction can be used as the coolant 5 disposed radially outside the combustion chamber 9. Further, in deflecting member 18, a wall portion 17 abutting against an inner circumferential surface of the coolant 5 is formed integrally with the circular portion 16. With this, the coolant 5 can be located and fixed, and additionally, so-called short-pass in which an operation gas is discharged without passing through the coolant can be prevented.

In the gas generator formed as described above, the transfer charge 7 is ignited and burnt by the igniter 6 activated by the application of the ignition electric current for activation, and the flame thereof is released, through the flame-transferring hole 14 in inner cylindrical member 4, into the accommodating space for gas generating agent 8. The flame of the transfer charge 7 is to ignite and burn the gas generating agent 8. And even when part of the flame passes directly through the coolant 5, it crashes into the cylindrical portion 19 of the deflecting member 18, and thereby, the flame can never be ejected directly through the gas discharging port 11. The operation gas generated by the gas generating agent 8 which is ignited by the flame of the transfer charge 7 passes through the coolant 5 and reaches the space 20 secured between the outer circumferential surface of the coolant 5 and the inner circumferential surface of the housing 3. If fluid or semifluid combustion products are included in the operation gas having passed coolant 5, those products crash and adhere to the cylindrical portion 19 of the deflecting member 18 arranged in the space 20, and they are removed from the operation gas.

EXAMPLE 1

A tank test was conducted using the gas generator having the structure shown in FIG. 1. In this gas generator, an inner cylindrical member having the axial length of 29 mm was used, and flame-transferring holes 14 were formed to position at 7 mm from the end surface of flange portion. And, these flame-transferring holes had the inner diameter of 3.2 mm and 4 (four) holes in all were formed circumferentially with the interval of 90 degrees. The tank curve thereof is shown in FIG. 3.

Figure 3:
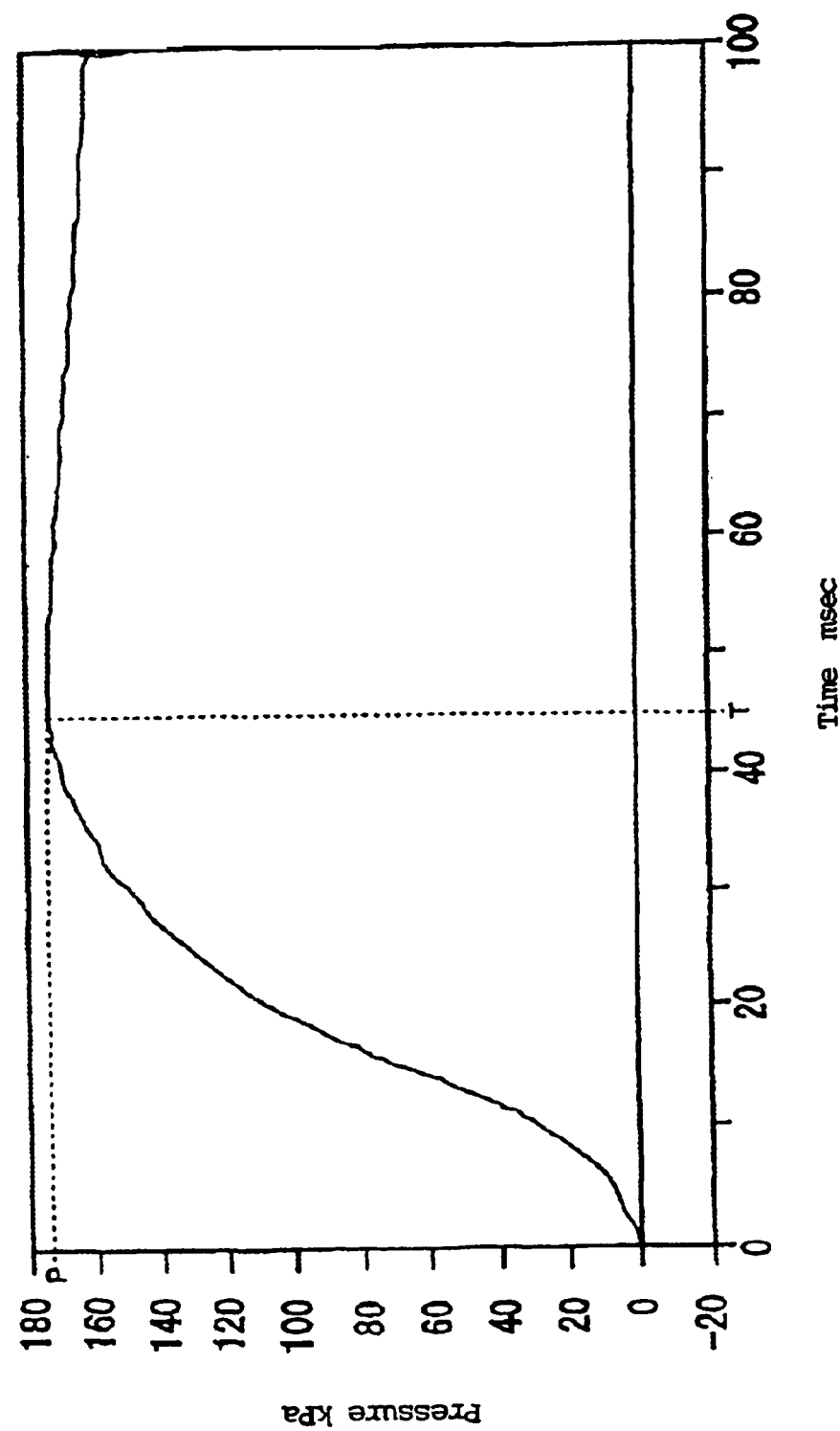
FIG. 3 is a tank curve of a tank test shown in the Example.

As evidenced by this FIG. 3, when a tank combustion test is conducted using a gas generator of the present invention, the gas generator can exhibit the tank pressure measured at $0.25 \times T$ milliseconds of not more than $0.25 \times P(kPa)$ and the tank pressure measured at $0.80 \times T$ milliseconds of not less than 0.70×P(kPa), when the maximum tank pressure is P(kPa) and a period of time from the start of rising of the tank pressure to the time when the maximum tank pressure P(kPa) has been reached is T milliseconds.

EXAMPLE 2

A tank combustion test was conducted using a gas generator shown in FIG. 1, and the time when the internal pressure of the housing reached the maximum (hereafter, also referred to as the time for the peak of the maximum internal pressure of the housing), after ignition electric current had been applied, was measured.

And, in the inner cylindrical member defining the ignition means accommodating chamber and the combustion chamber, flame-transferring holes described in the following (1) or (2) were formed as communicating portions which can make both chambers communicated with each other. The results are shown in FIG. 1.

And, the explanation of detail of the gas generator used in this example is omitted, with referring to the embodiment above.
(1) A gas generator in which 8 (eight) communicating portions comprising flame-transferring holes (enhancer nozzles) having the inner diameter of 2.2 mm were formed circumferentially in the inner cylindrical member, with the central angle of 45 degrees between adjacent communicating portions.
(2) A gas generator in which 12 (twelve) communicating portions comprising flame-transferring holes (enhancer nozzles) having the inner diameter of 1.85 mm were formed circumferentially in the inner cylindrical member, with the central angle of 30 degrees between adjacent communicating portions.

The time when the internal pressure of the housing reached the maximum, which is obtained by using a gas generator shown in (1) or (2) above, were shown in Table 1.

TABLE 1

| Inner diameter (mm) × number of flame-transferring holes | Central angle between adjacent flame-transferring holes (degree) | Time when the maximum of internal pressure of the housing was obtained (milliseconds) |
|---|---|---|
| φ2.2 × 8 | 45 | 16 |
| φ1.85 × 12 | 30 | 14 |

As evidenced by these results, ignitability of the gas generating agent can be improved by forming many communicating portions (the flame-transferring holes in this embodiment), that is, by decreasing the central angle between adjacent flame-transferring holes.

By this, a gas generator for an air bag which can inflate an air bag rapidly after the impact is realized.

However, the objective of this example is to confirm the improvement of ignitability of the gas generating agent according to a shape and an arrangement of the communicating portions (the flame-transferring holes). Thus, generally similar effect to these examples can be confirmed by using gas generators in which a shape and an arrangement of the communicating portions (the flame-transferring holes) are different as shown in (1) or (2) above and the other configurations are similar. That is, in confirming effects of the present invention, any gas generating agents can be used as the gas generating agent used in gas generators (1) or (2) above, as long as their gas outputs and linear burning rates are the same, and as long as a space volume in gas generators capable of contributing to combustion of gas generating agent are the same, similar effect can be confirmed.

Embodiment 3 of the Invention

In FIG. 1, the gas discharging port 11 and the flame-transferring hole 14 are each sealed with a seal tape 15, and the gas generating agent 8 is supported by the underplate 22 and is accommodated in the combustion chamber. Also, the member described as the deflecting member 18 in this embodiment can function as a mist catching member or a flame preventing plate with the similar structure.

Embodiment 4 of the Invention

Figure 2:
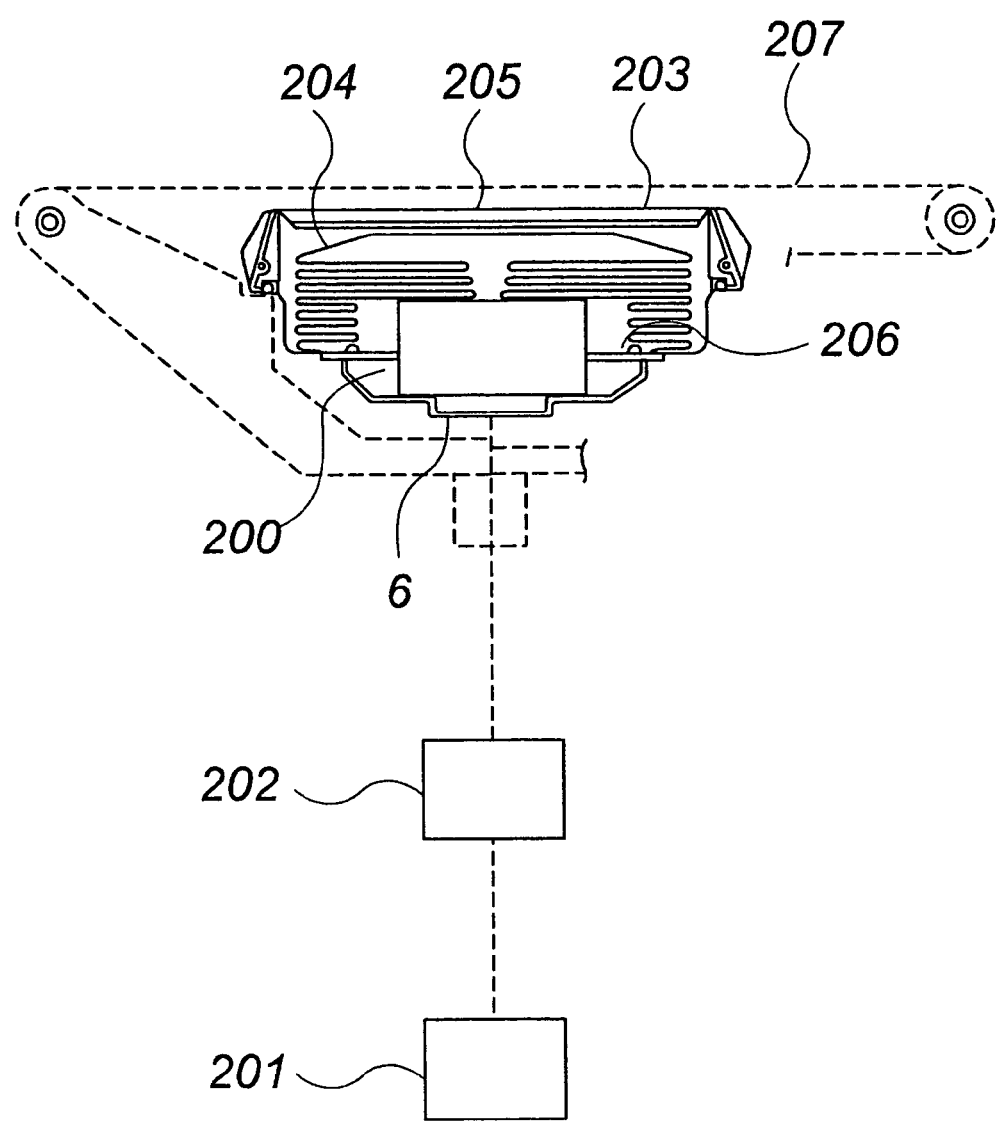
FIG. 2 is a schematic drawing showing an air bag apparatus of the present invention.

An example of an air bag apparatus of the present invention comprising a gas generator using an electric ignition type igniter is shown in FIG. 2.

This air bag apparatus comprises a gas generator 200, an impact sensor 201, a control unit 202, a module case 203 and an air bag 204. As gas generator 200, the gas generator explained based on FIG. 1 is used, and the operation performance thereof is adjusted such that it is activated to apply as small an impact as possible to a vehicle occupant at the initial stage of activation.

The impact sensor 201 may be, for example, a semiconductor type acceleration sensor. The semiconductor type acceleration sensor has four bridge-connected semiconductor strain gauges attached on a beam of silicon substrate that deflects when subjected to an acceleration.

When an acceleration is applied, the beam deflects causing strain on its surface, which in turn change the resistance of the semiconductor strain gauges. The change in resistance is to be detected as a voltage signal proportional to the acceleration.

The control unit 202 has an ignition decision circuit, which is supplied with a signal from the semiconductor type acceleration sensor. When the impact signal from the sensor 201 exceeds a predetermined value, the control unit 202 starts calculation. When the result of the calculation exceeds a predetermined value, the control unit outputs an activation signal (that is, an ignition electric current for activation) to the igniter 6 of the gas generator 200.

The module case 203 is formed of, for example a polyurethane, and includes a module cover 205. In this module case 203, the air bag 204 and the gas generator 200 are accommodated to form a pad module. This pad module, when mounted on the driver side, is normally installed in a steering wheel 207.

The air bag 204 is made of nylon (for example, nylon 66) or polyester with its bag inlet 206 surrounding the gas discharging ports of the gas generator. The air bag is folded and fixed to the flange portion of the gas generator.

When the semiconductor type impact sensor 201 detects the impact at the time of collision of an automobile, the signal is sent to the control unit 202, which, when the impact signal from the sensor exceeds a predetermined value, starts a calculation. If the result of the calculation exceeds a predetermined value, the control unit outputs an activation signal to the igniter 6 of the gas generator 200. The igniter 4 is then activated to ignite and burn the gas generating agent to produce a gas. The gas is ejected into the air bag 204, causing the air bag to inflate with breaking the module cover 205, thereby forming a shock-absorbing cushion between the steering wheel 207 and the vehicle occupant.

The invention claimed is:

1. A gas generator for an air bag comprising:
a housing having a gas discharging port;
a substantially cylindrical inner cylindrical member disposed in the housing, an ignition means accommodating chamber defined inside the inner cylindrical member, a combustion chamber defined outside the inner cylindrical member; and
plural flame-transferring holes formed in the circumferential surface of the inner cylindrical member to communicate the ignition means accommodating chamber with the combustion chamber, wherein
the plural flame-transferring holes are formed at a distance of less than 30% of the axial length of the inner cylindrical member, from an end of the inner cylindrical member,
the flame-transferring hole is formed to have the inner diameter of 1 to 4 mm, and
the flame-transferring holes are formed radially on the circumferential surface of the inner cylindrical member, and the central angle formed by the adjacent flame-transferring holes being not less than 60 degrees.

2. The gas generator for an air bag according to claim 1, wherein the plural flame-transferring holes are formed at a distance of less than 25% of the axial length of the inner cylindrical member, from an end of the inner cylindrical member.

3. The gas generator for an air bag according to claim 1 or 2, wherein an igniter, which is activated when an ignition electric current for activation is applied, is accommodated in one axial end side of the inner cylindrical member, and the plural flame-transferring holes are formed in the end being opposite, divided at the center of the axis of the inner cylindrical member.

4. The gas generator for an air bag according to claim 1, wherein the ignition means accommodating chamber accommodates an ignition means including an igniter which is activated when an ignition electric current is applied, the flame-transferring holes are for ejecting a flame generated by activation of the ignition means into the combustion chamber, and the flame-transferring holes eject a flame of a transfer charge with horizontal angle of more than 60 degrees, having the perpendicular axis as a center.

5. The gas generator for an air bag according to claim 1, wherein the ignition means accommodating chamber accommodates an ignition means including an igniter which is activated when an ignition electric current is applied, and the operation performance thereof is adjusted such that the tank pressure measured at $0.25 \times T$ milliseconds is not more than $0.25 \times P(kPa)$ when the maximum tank pressure is $P(kPa)$, and a period of time from the start of rising of the tank pressure to the time when the maximum tank pressure $P(kPa)$ has been reached is T milliseconds in tank combustion test.

6. The gas generator for an air bag according to claim 1, wherein the ignition means accommodating chamber accommodates an ignition means, including an igniter which is activated when an ignition electric current is applied, and the operation performance thereof is adjusted such that the tank pressure measured at $0.80 \times T$ milliseconds is not less than $0.70 \times P(kPa)$ when the maximum tank pressure is $P(kPa)$, and a period of time from the start of rising of the tank pressure to the time when the maximum tank pressure $P(kPa)$ has been reached is T milliseconds in tank combustion test.

7. The gas generator for an air bag according to claim 1, wherein the ignition means accommodating chamber accommodates an ignition means including an igniter which is activated when an ignition electric current is applied, the combustion chamber accommodates a gas generating agent ignited and burnt by activation of the ignition means to generate a combustion gas, and the pressure inside the housing reaches its maximum at 10 to 20 milliseconds after the ignition electric current is applied.

8. The gas generator for an air bag according to claim 1, wherein the ignition means accommodating chamber accommodates an ignition means including an igniter which is activated when an ignition electric current is applied, the plural flame-transferring holes are formed to eject a flame generated by activation of the ignition means into the combustion chamber, and both of an elevation angle and a depression angle of a ejected flame are adjusted to 45 degrees.

9. An air bag apparatus comprising a gas generator, an impact sensor detecting an impact to activate the gas generator, an air bag introducing a gas generated in the gas generator to inflate, and a module case accommodating the gas generator, wherein the gas generator for an air bag is a gas generator according to claim 1.

10. A gas generator for an air bag comprising:
a housing having a gas discharging port;
a substantially cylindrical inner cylindrical member disposed in the housing;
an ignition means accommodating chamber for accommodating a ignition means defined inside the inner cylindrical member;
a combustion chamber for accommodating gas generating agent defined outside the inner cylindrical member; and
plural communicating portions circumferentially formed on the circumferential surface of the inner cylindrical member to communicate the ignition means accommodating chamber with the combustion chamber, wherein
the central angle formed by the adjacent communicating portions is not less than 60 degrees,
the communicating portion comprises at least one flame-transferring hole radially penetrating the inner cylindrical member, and
the flame-transferring hole is formed to have the inner diameter of 1 to 4mm.

11. The gas generator for an air bag according to claim 10, wherein the communicating portion comprises at least two flame-transferring holes radially penetrating in the inner cylindrical member.

12. A gas generator for an air bag comprising;
a housing having a gas discharging port;
a substantially cylindrical inner cylindrical member disposed in the housing;
an ignition means accommodating chamber for accommodating an ignition means defined inside the inner cylindrical member;
a combustion chamber for accommodating a gas generating agent defined outside the inner cylindrical member, and
plural flame-transferring holes for ejecting a flame generated by activation of the ignition means into the combustion chamber, wherein
the plural flame-transferring holes are formed on the circumferential surface of the inner cylindrical member, and the flame-transferring holes eject a flame, generated by activation of the ignition means into the combustion chamber, at 45 degree of elevation angle and depression angle,
the flame-transferring hole is formed to have the inner diameter of 1 to 4mm, and the flame-transferring holes are radially formed on the circumferential surface of the inner cylindrical member, and the central angle formed by the adjacent communicating portions being not less than 60 degrees.

13. A gas generator for an air bag comprising:
a housing having a gas discharging port;
a substantially cylindrical inner cylindrical member disposed in the housing;
an ignition means accommodating chamber for accommodating an ignition means defined inside the inner cylindrical member;
a combustion chamber for accommodating a gas generating agent defined outside the inner cylindrical member; and
plural flame-transferring holes for ejecting a flame generated by activation of the ignition means into a first combustion chamber, wherein
the plural flame-transferring holes are formed on the circumferential surface of the inner cylindrical member, and the flame-transferring holes are formed at a distance of 30% to 70% of the axial length of the inner cylindrical member, from an end of the inner cylindrical member, the flame-transferring holes being formed on the circumferential surface of the inner cylindrical member, and the central angle formed by the adjacent flame-transferring holes being not less than 60 degrees.

14. The gas generator for an air bag according to claim 13, wherein the plural flame-transferring holes are formed at a distance of 40% to 60% of the axial length of the inner cylindrical member, from an end of the inner cylindrical member.

15. The gas generator for an air bag according to claim 13 or 14, wherein an igniter which is activated when an ignition electric current for activation is applied in one axial end side of the inner cylindrical member, and the plural flame-transferring holes are formed in the end being opposite, divided with respect to the axial center of the inner cylindrical member.

16. The gas generator for an air bag according to claim 13, wherein the ignition means accommodating chamber accommodates an ignition means including an igniter which is activated when an ignition electric current is applied, the plural flame-transferring holes ejecting a flame generated by activation of the ignition means into the combustion chamber are circumferentially formed on the circumferential surface of the inner cylindrical member, and the horizontal angle of an ejecting flame from the flame-transferring holes is adjusted to not less than 60 degrees having, as the center, the axis perpendicular to the center of the flame-transferring holes.

17. The gas generator for an air bag according to claim 13, wherein the ignition means accommodating chamber accommodates an ignition means including an igniter which is activated when an ignition electric current is applied, the combustion chamber accommodates a gas generating agent ignited and burnt by activation of the ignition means to generate a combustion gas, and the pressure inside the housing reaches its maximum at 5 to 20 milliseconds after the ignition electric current is applied.

18. A gas generator for an air bag comprising;
a housing having a gas discharging port;
a substantially cylindrical inner cylindrical member disposed in the housing;
an ignition means accommodating chamber for accommodating an ignition means defined inside the inner cylindrical member; and
a combustion chamber for accommodating a gas generating agent defined outside the inner cylindrical member, and
plural communicating portions circumferentially formed on the circumferential surface of the inner cylindrical member to communicate the ignition means accommodating chamber with the combustion chamber, wherein
the central angle formed by the adjacent communicating portions is not more than 60 degrees.

19. The gas generator for an air bag according to claim 18, wherein the communicating portion comprises one or at least two flame-transferring holes radially penetrating in the inner cylindrical member.

20. The gas generator for an air bag according to claim 19, wherein the communicating portion comprises one flame-transferring hole radially penetrating in the inner cylindrical member, and the flame-transferring hole is formed to have the inner diameter of 1 to 4mm.

21. The gas generator for an air bag according to any one of claim 1, 10, 12, 13 and 18, wherein, the central angle formed by the adjacent communicating portions or flame-transferring holes is 90 degrees or higher.

22. The gas generator for an air bag according to any one of claim 1, 10, 12, 13 and 18, further comprising a deflecting member which has a cylindrical portion and which is disposed circumferentially between said combustion chamber and said discharge port.

23. A method for obtaining an S-shaped tank curve from a gas generator during a tank combustion test, comprising:
providing the gas generator of any one of claims 1, 10, 12 and 18;
activating the ignition means by applying an ignition electric current; and
setting parameters of the gas generator such that the tank pressure the tank pressure measured at $0.25 \times T$ (milliseconds) is not more than $0.25 \times P(kPa)$ and the tank pressure measured at $0.80 \times T$ (milliseconds) is not less than $0.70 \times P(kPa)$,
wherein P represents the maximum tank pressure (kPa), and T represents a period of time from the start of rising of the tank pressure to the time when the maximum tank pressure P(kPa) has been reached (milliseconds) in tank combustion test.

24. A method for obtaining an S-shaped tank curve meeting parameters that the tank pressure the tank pressure measured at $0.25 \times T$ (milliseconds) is not more than $0.25 \times P(kPa)$ and the tank pressure measured at $0.80 \times T$ (milliseconds) is not less than $0.70 \times P(kPa)$ during a tank combustion test from a gas generator, comprising:
providing the gas generator of any one of claims 1, 10, 12, 13 and 18; and
activating the ignition means by applying an ignition electric current.

25. A method to inflate an air bag, comprising:
providing the gas generator of any one of claims 1, 10, 12 and 18;
activating the ignition means by applying an ignition electric current; and
setting parameters of the gas generator such that the tank pressure the tank pressure measured at $0.25 \times T$ (milli seconds) is not more than 0.25×P(kPa) and the tank pressure measured at 0.80×T (milliseconds) is not less than 0.70×P(kPa), wherein P represents the maximum tank pressure (kPa), and T represents a period of time from the start of rising of the tank pressure to the time when the maximum tank pressure P(kPa) has been reached (milliseconds) in tank combustion test.

* * * * *